Figure 1:
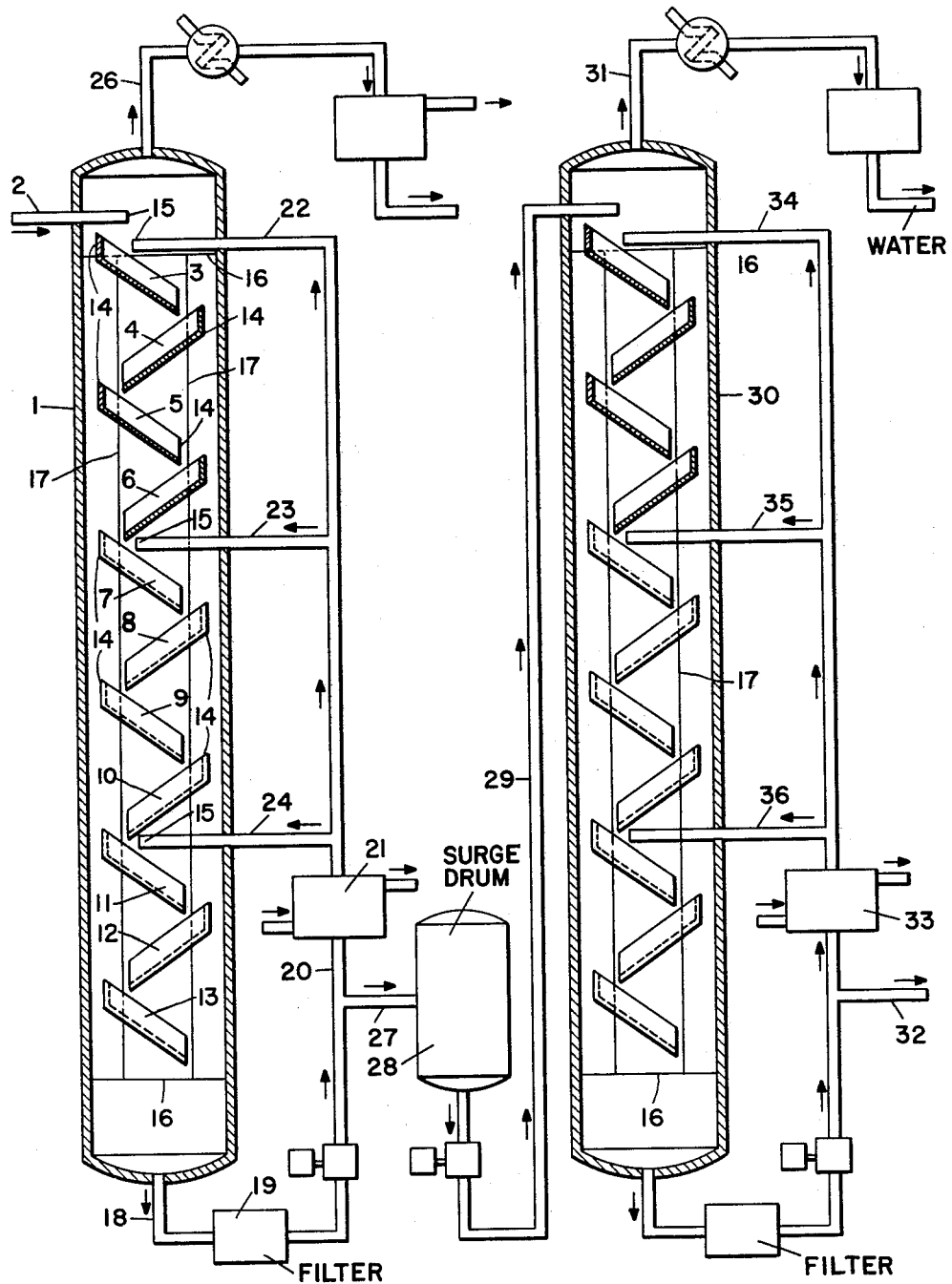

Oct. 10, 1961  D. W. PUGH ET AL  3,003,930
PROCESS OF STRIPPING A LATEX SOLUTION
Filed July 21, 1958  2 Sheets-Sheet 2
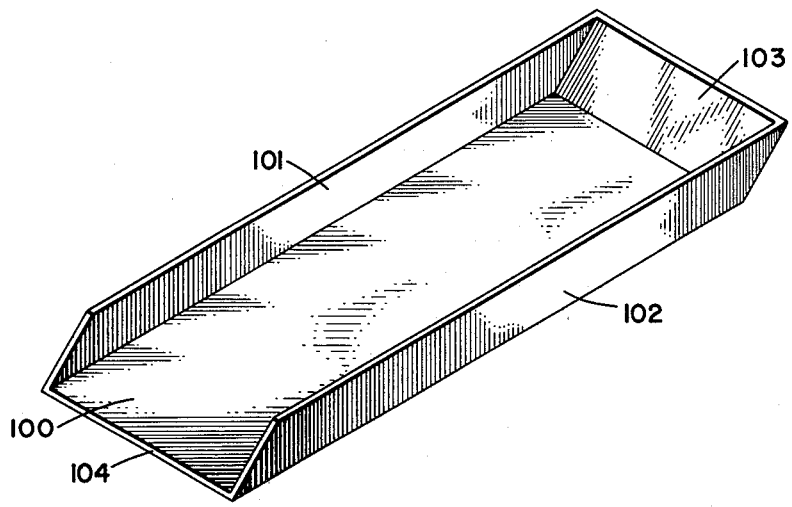
FIG.-2
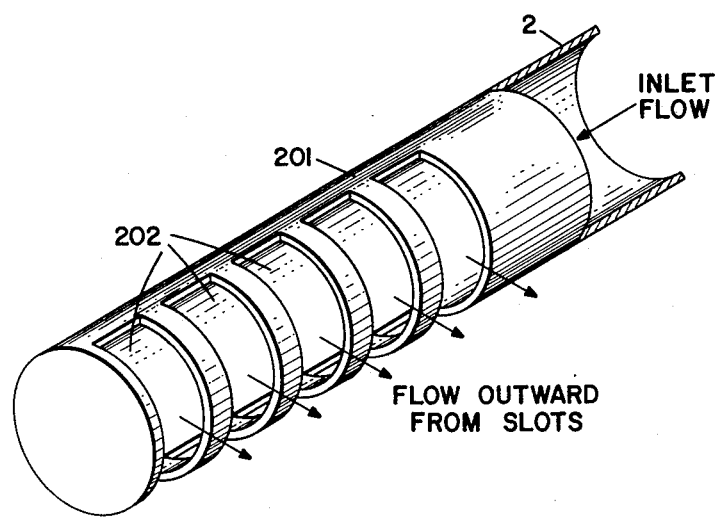
FIG.-3
Duane Wood Pugh
Sydney Lipton  Inventors
By  Attorney ര
United States Patent Office 3,003,930
Patented Oct. 10, 1961

3,003,930
PROCESS OF STRIPPING A LATEX SOLUTION
Duane Wood Pugh, Baton Rouge, La., and Sydney Lipton, Bayonne, N.J., assignors to Esso Research and Engineering Company, a corporation of Delaware
Filed July 21, 1958, Ser. No. 749,994
2 Claims. (Cl. 202—46)

The present invention relates to an improved process and apparatus for stripping a volatile component from a liquid mixture or solution of lighter and heavier components and more particularly relates to a novel plate construction in a vertical tower whereby volatile components can be removed from mixtures or solutions of a plurality of components with minimum vapor-liquid contacting and substantial elimination of re-entrainment of the stripped component.

The invention is particularly directed to processes in which aqueous dispersions of hydrocarbon polymers dissolved in volatile hydrocarbon solvents are stripped of the solvent to leave a dispersion of the polymer in the water. In accordance with prior art methods, the raw latex of polymer, solvent and water is placed in a heated vessel and an inert gas such as steam is passed through in order to volatilize the solvent. In such systems difficulties arise which affect the production of finished latex adversely. Among these difficulties are the tendency of the latex to foam, the difficulty of preventing re-entrainment of the stripped latex with the solvent and the large number of vessels needed.

In analyzing the necessary mechanism required in stripping polymer latices it is apparent that several basic effects are highly desirable. First, means should be provided for decreasing foaming and thus increasing stripping rate. Second, means should be established for proper temperature control so as to secure flexibility of operation. Third, means should be provided for preventing re-entrainment of the solvent vapors into the stripped latex. Finally, means must be provided for adequately heating the raw latex while protecting it from exposure to hot surfaces which cause coagulation and plating out of rubber.

It is therefore the main object of this invention to provide a type of stripping tower design which will most effectively increase the stripping rate, minimize foam formation, maintain the widest possible operating conditions consistent with efficient stripping, prevent re-entrainment of the stripped component and protect the unstabilized latex from exposure to hot surfaces.

In accordance with these objects, a novel plate design has been developed which provides a series of inclined open-ended box-like trays spaced from the tower wall which cause the latex feed introduced at the top of the tower to cascade downward in a thin layer changing direction at each plate. Latent heat is supplied at multiple locations by means of a stream of recycled stripped latex. Temperature differences in the tower are controlled by the amount of recycle introduced at a given point.

The novel tower of this invention broadly comprises a shell provided with a vertical series of transverse plate members spaced from the shell in zig-zag, angularly sloped relationship thereto and to each other. Each plate is provided on three sides with upwardly-extending edges arranged vertically to the plate proper. The plates extend in pairs from an area of vertically spaced maximum convergence near the shell to a diametrically opposed area of vertically spaced maximum divergence near the shell. The lower plate of the pair at each point of maximum convergence extends beyond the point of convergence. The upper plate of the pair terminates short of the point of convergence and is so oriented that the side of the plate which has no upwardly extending edge opens into the space created by the convergence. In let nozzles are provided at spaced points at areas of convergence to bring fresh recycle for adding heat to the tower.

The nature of this invention may be fully understood from a consideration of the accompanying drawings as referred to in the following description. In these drawings, FIG. 1 illustrates in diagrammatic form a flow plan utilizing a complete stripping tower embodying the novel plate design of this invention together with the accompanying lines for recycling latex to spaced points within the tower. FIG. 2 illustrates in detail the construction of the individual plates, and FIG. 3 illustrates the construction of the nozzles used to introduce the fresh feed and recycle latex.

Referring to FIGURE 1, it is assumed that a raw latex such as a dispersion of a hydrocarbon solution of butyl rubber in water is to be stripped. The raw latex is introduced into the top of the stripping tower above the topmost plate by means of line 2. Angularly disposed in zig-zag relationship throughout the vertical length of the tower are a plurality of open-ended box-like plates indicated by numerals 3, 4, 5, 6, 7, 8, 9, 10, 11, 12, and 13. These plates are spaced from the walls of the tower shell and are so arranged that they converge in pairs in alternate directions throughout the tower. The plates are supported in the tower by conventional means; for example, by transverse supports 16 and vertical supports 17. In each pair of plates at the point of convergence the lower plate extends beyond the point of convergence. The upper plate in the area of maximum convergence terminates short of the point of convergence with the lower plate, with the open end of the plate discharging into the area formed by the convergence, thus providing a channel between the plates.

As shown in FIGURE 2, each plate is provided with a bottom flat section 100, and three vertically-extending edges 101, 102 and 103, edges 101 and 102 being perpendicularly attached to flat section 100 and edge 103 being arranged parallel to the tower 1. This arrangement leaves edge 104 perfectly flat with no vertically arranged edge. Edge 104 on each plate opens into the space provided by the convergence of the plates and thus allows the contents of the upper plate to be discharged into the lower plate.

The plates are preferably disposed at 15° angles with reference to the tower wall but this is not critical, any angular relationship between 1° and 45° being suitable.

Above the topmost plate 3 and at spaced intervals throughout the tower in the area of maximum convergence of the plates there are provided nozzles 15 for introducing fresh feed and recycle latex.

Referring now to FIGURE 3, there is shown an enlarged detail of nozzles 15. This nozzle consists of a cylinder 101 and is simply an extension of line 2 closed at its end. This cylinder is provided with a series of large slots 202 longitudinally arranged with respect to each other, each slot extending about 180° circumferentially around the cylinder. The nozzle is oriented with respect to the plate above which it is introduced so that the slots 202 face the plate. Thus fresh feed or recycled latex is introduced directly against the plate but because of their large size pressure drop is minimized and foaming is reduced. The number of slots and their circumferential extension allows a large area of the plate to be covered by the incoming feed or recycle.

Returning now to FIGURE 1, raw latex of polymer in solvent and water is introduced into tower 1 through line 2 and nozzle 15 above the plate 3. Simultaneously, hot recycle latex is introduced above the same plate by line 22 and nozzle 15. Raw and recycled latex pass down the tower together falling from plate to plate. At the same time vapors of the solvent and water rise and pass out through line 26. The latex passes from plate to plate in the area of maximum convergence of the plates while the vapors pass up the tower through the area of maximum divergence and through the space formed between the lips 14 and the tower wall. Thus, there is a minimum contact between the vapor and the latex and re-entrainment is practically eliminated.

Stripped latex accumulates in the bottom of the tower below the lowermost plate. This section is maintained 5–7° cooler than the rest of the tower to prevent vapor lock in the pump. Stripped latex (35–38% solids) is withdrawn from the bottom of the tower through line 18 and passed through filter 19 to remove any coagulated polymer. It is then split into two streams. One stream is passed through line 20 to heat exchanger 21 where it is heated up to about 150–200° F. at atmospheric pressure, preferably 175–185° F., in indirect heat exchange with hot water or exhaust steam. From the heat exchanger 21 the hot latex passes by lines 22, 23 and 24 to the nozzle 15 where it is introduced at spaced points within the tower to carry heat into the tower and avoid the use of heat transfer surfaces with which the raw or unstripped latex would come into contact. This contact would cause the latex to coagulate and plate out on such surfaces.

The other stream passes by line 27 into surge drum 28 from which it is pumped by line 29 into tower 30. This tower is in all respects identical with tower 1. This tower, however, is maintained under slightly different conditions than tower 1. The temperature is maintained between 160–185° F., preferably 170–175° F., at an absolute pressure of 7 pounds. Water is taken overhead through line 31 and finished latex of 50–55% solids content is removed through line 32. Recycle is pumped back to the tower through heat exchanger 33 and lines 34, 35 and 36.

This invention is applicable to the stripping of any type of liquid or liquid dispersions and can be used to concentrate a solution or completely remove one component of a liquid solution or dispersion. It is particularly adapted to the removal of hydrocarbon solvent or water or both from a dispersion in water of a solution of a hydrocarbon polymer in a liquid hydrocarbon. In the preparation of polymer latices it is conventional to dissolve the polymer in a hydrocarbon solvent, disperse this solution in water with a suitable emulsifier and then strip off the solvent to leave a dispersion of polymer in water. Polymers which may be treated in this manner include natural rubber, polyisobutylene, various synthetic rubbers such as butyl rubber (a copolymer of 97% isobutylene and 3% isoprene), BSR (a copolymer of butadiene and styrene prepared by emulsion polymerization and formerly known as GR–S), polybutadiene and copolymers of butadiene and styrene prepared by mass polymerization with sodium, BNR (a copolymer of butadiene and acrylonitrile prepared by emulsion polymerization and formerly known as GRN or Paracril), and resins such as the copolymers of isobutylene and styrene (prepared at low temperatures with Friedel-Crafts catalysts) and petroleum resins (prepared from steam-cracked petroleum streams, such as naphtha, kerosene or gas oil, by the use of Friedel-Crafts catalysts at low temperatures) as well as any other water-insoluble hydrocarbon-soluble polymer.

The following example is given to illustrate but not to limit the invention.

*Example*

An aqueous dispersion of a solution of butyl rubber in hexane containing about 13% solids was introduced into a pilot plant installation incorporating the features of FIGURE 1 and stripped of hexane to produce a latex of 34–38% solids. The following data were obtained on this run:

| | |
|---|---|
| Run length | 61 hours. |
| Latex feed rate | 1.17 gal./min. |
| Tower temperature | 185° F. |
| Tower pressure | 14.7 p.s.i.a. |
| Hexane removal overhead from tower | 230 lbs./hr. |
| Water removal with hexane | 75 lbs./hr. |
| Stripping rate | 0.69 ton/day. |

This latex was then introduced into the second tower of FIGURE 1 and stripped of water to recover a finished latex containing 50–55% solids. The following data were obtained on this run:

| | |
|---|---|
| Tower temperature | 174° F. |
| Tower pressure | 7.2 p.s.i.a. |
| Water removal | 195 lbs./hr. |
| Stripping rate | 2.92 tons/day. |

This run indicated that a raw polymer latex could be continuously stripped in a column adapted for commercial usage without undue foaming, re-entrainment of vapors or coagulation of the latex and a finished latex suitable for marketing prepared.

The nature and objects of the present invention having been thus fully illustrated and set forth, what is claimed as new and useful and desired to be secured by Letters Patent is:

1. Process for stripping a liquid from a polymer latex which comprises passing said latex downwardly in alternately oblique directions through a stripping zone, withdrawing stripped latex from the bottom of said stripping zone, heating a portion of said withdrawn latex to a temperature between 150° and 200° F., and returning it to the stripping zone at spaced points therein to provide the sole means of introducing heat to said stripping zone.

2. Process for stripping a liquid from a polymer latex which comprises passing said latex downwardly in alternately oblique directions through a stripping zone, whereby the liquid is vaporized, passing the vaporized liquid upwardly through said stripping zone out of contact with said latex, withdrawing stripped latex from the bottom of said stripping zone, heating a portion of said withdrawn latex to a temperature between 150° and 200° F., returning said heated latex to the stripping zone at spaced points therein and mixing it with the latex descending through said stripping zone to heat said latex and vaporize the liquid contained therein.

References Cited in the file of this patent

UNITED STATES PATENTS

| | | |
|---|---|---|
| 390,537 | Webster | Oct. 2, 1888 |
| 1,153,401 | Milne | Sept. 14, 1915 |
| 1,249,480 | Pflugfelder | Dec. 11, 1917 |
| 1,654,826 | Moore | Jan. 3, 1928 |
| 1,738,543 | Travers | Dec. 10, 1929 |
| 2,514,207 | Johnson | July 4, 1950 |
| 2,645,607 | Allen | July 14, 1953 |

FOREIGN PATENTS

| | | |
|---|---|---|
| 12,384 | Great Britain | July 17, 1902 |